(12) United States Patent
Awater et al.

(10) Patent No.: US 7,468,960 B2
(45) Date of Patent: Dec. 23, 2008

(54) NETWORK SYSTEM COMPRISING ACCESS POINTS

(75) Inventors: Geert Arnout Awater, Utrecht (NL); Wilhelmus Diepstraten, Noord-Brabant (NL); Adriaan Kamerman, Utrecht (NL)

(73) Assignee: Agere Systems Inc., Allentown, PA (US)

( * ) Notice: Subject to any disclaimer, the term of this patent is extended or adjusted under 35 U.S.C. 154(b) by 942 days.

(21) Appl. No.: 10/140,689

(22) Filed: May 8, 2002

(65) Prior Publication Data

US 2002/0181418 A1    Dec. 5, 2002

(30) Foreign Application Priority Data

May 8, 2001    (EP)    ................... 01304148

(51) Int. Cl.
*H04Q 7/00*    (2006.01)
(52) U.S. Cl. .................... 370/329; 370/252; 455/450
(58) Field of Classification Search ................ 370/329
See application file for complete search history.

(56) References Cited

U.S. PATENT DOCUMENTS

| | | | |
|---|---|---|---|
| 5,649,290 A | 7/1997 | Wang | 370/332 |
| 5,815,811 A | 9/1998 | Pinard et al. | 455/434 |
| 5,822,318 A | 10/1998 | Tiedemann, Jr. et al. | 370/391 |
| 5,856,971 A | 1/1999 | Gitlin et al. | 370/335 |
| 5,933,420 A | 8/1999 | Jaszewski et al. | 370/329 |
| 6,067,291 A * | 5/2000 | Kamerman et al. | 370/338 |
| 6,069,871 A | 5/2000 | Sharma et al. | 370/209 |
| 6,101,179 A * | 8/2000 | Soliman | 370/342 |
| 6,134,226 A * | 10/2000 | Reed et al. | 370/328 |
| 6,215,982 B1 * | 4/2001 | Trompower | 455/63.3 |
| 6,377,562 B1 * | 4/2002 | Schneider | 370/330 |
| 6,393,261 B1 | 5/2002 | Lewis | 455/103 |
| 6,456,850 B1 | 9/2002 | Kim et al. | 455/453 |

(Continued)

FOREIGN PATENT DOCUMENTS

EP    0 528 522 A2    6/1992

(Continued)

OTHER PUBLICATIONS

Dec. 17, 2001, European Search Report.

(Continued)

*Primary Examiner*—Firmin Backer
*Assistant Examiner*—Mohammad S Adhami
(74) *Attorney, Agent, or Firm*—Mendelsohn & Associates, PC; Steve Mendelsohn

(57) ABSTRACT

In one embodiment, a network system has a plurality of access points, wherein each access point can be used for wireless communication with at least one station, wherein each access point can (1) receive a probe signal with either a first or second channel frequency and (2) generate and transmit, in response to the probe signal, a response signal with the first or second channel frequency. At least one access point selects at least one channel frequency for the wireless communication with the at least one station on the basis of at least one response signal received with the first channel frequency as transmitted by any of the other access points and/or at least one response signal received with the second channel frequency as transmitted by any of the other access points.

13 Claims, 2 Drawing Sheets

U.S. PATENT DOCUMENTS

| | | | |
|---|---|---|---|
| 6,470,184 B1* | 10/2002 | Machida | 455/453 |
| 6,526,027 B1* | 2/2003 | Yeom | 370/312 |
| 6,580,700 B1 | 6/2003 | Pinard et al. | 370/332 |
| 6,584,315 B1* | 6/2003 | Kang et al. | 455/442 |
| 6,611,506 B1 | 8/2003 | Huang et al. | 370/329 |
| 6,646,995 B1* | 11/2003 | Le Strat et al. | 370/252 |
| 6,675,020 B2* | 1/2004 | Sawyer | 455/522 |
| 6,954,616 B2* | 10/2005 | Liang et al. | 455/63.1 |
| 6,978,143 B1* | 12/2005 | Vialen | 455/452.2 |
| 2002/0021679 A1* | 2/2002 | Paneth et al. | 370/330 |
| 2002/0105926 A1* | 8/2002 | Famolari et al. | 370/331 |
| 2002/0111163 A1* | 8/2002 | Hamabe | 455/425 |
| 2004/0264498 A1* | 12/2004 | Feuerstraeter et al. | 370/465 |

FOREIGN PATENT DOCUMENTS

EP  0 903 891  9/1998

OTHER PUBLICATIONS

Hassanein W: "USB For Non-PC Systems" Electronic Product Design, GB,IML Publication, vol. 20, No. 6, Jun. 1999, pp. 25-26, XP 000923088.

"*QOS Provisioning In Handoff Algorithms For Wireless LAN*," by Chi-chun Lo, Ming-Hua Lin, Proceedings of International Zurich Seminar on Broadband Communications, Zurich, Switzerland, Feb. 17-19, 1998, pp. 9-16, XP002151137, 1998, New York, NY, USA, IEEE.

* cited by examiner

NETWORK SYSTEM COMPRISING ACCESS POINTS

CROSS-REFERENCE TO RELATED APPLICATION

This application claims priority of European Patent Application No. 01304148.8, which was filed on May 8, 2001.

BACKGROUND OF THE INVENTION

The invention relates to a network system comprising a plurality of access points, wherein each access point can be used for wireless communication with at least one station, wherein each access point is arranged:
- to receive a probe signal with a first channel frequency or to receive a probe signal with a second channel frequency; and
- to generate and transmit in response to the probe signal received with a first channel frequency a response signal with a first channel frequency and to generate and transmit in response to the probe signal received with the second channel frequency a response signal with the second channel frequency.

A network system as described hereinabove is known. The system is used for wireless communication between at least one station and the network. The station can freely be moved within an area in which communications between the station and at least one access point remains possible. Before a station starts communicating with an access point, the station will search for an access point that allows for reliable and suitable communication conditions. The station is hereto arranged to generate and transmit a probe signal with a first channel frequency and a probe signal with a second channel frequency. At a certain time each access point is arranged to receive a probe signal with a first channel frequency or is arranged to receive a probe signal with a second channel frequency. Each access point is further arranged to generate and transmit in response to a received probe signal, a response signal with a channel frequency which corresponds to the channel frequency of the received probe signal. The station is arranged to establish communication with an access point if the reception from a signal from that access point is satisfactory. If the station moves, reception conditions may change and the station may start generating and transmitting a new probe signal with the aim to end up establishing communication with another access point or using other channel frequencies, or both.

These known network systems often operate according to a medium access scheme as described in the IEEE 802.11 standard for wireless communication with a station.

Communication on a certain channel frequency between a first station and a first access point may be disturbed by, for instance, interference due to communication between a second access point and a second station which exchange signals with the same channel frequency or nearly the same channel frequency. Also other apparatuses, such as microwave ovens, or radios, which are closely located to the network system may form interference sources.

Access points which are arranged to receive a probe signal with a first channel frequency may for this reason need to be rearranged to receive signals with a second channel frequency instead of signals with a first channel frequency. This rearranging may, for instance, be carried out by a (computer) network administrator. However, it is rather impractical for a network administrator to select for each access point a channel frequency for receiving signals, especially within multi-floor buildings, where stations move freely between levels separated by concrete floors and where many interfering devices are in use. The object of the invention is to provide an alternative network system wherein a network administrator is not needed to select a channel frequency for use in wireless communication between an access point of the network system and a station.

SUMMARY OF THE INVENTION

To this end, according to a first aspect of the invention, at least one access point is arranged:
- to generate and transmit the probe signal with the first channel frequency and to generate and transmit the probe signal with the second channel frequency; and
- to receive at least a response signal with the first channel frequency as transmitted by any of the other access points which has received the probe signal with the first channel frequency as transmitted by the at least one access point and to receive at least a response signal with the second channel frequency as transmitted by any of the other access points which has received the probe signals with the second channel frequency as transmitted by the at least one access point, wherein the at least one access point is further arranged
- to select at least one channel frequency for the wireless communication with the at the least one station on the basis of at least one response signal received with the first channel frequency as transmitted by any of the other access points and/or the at least one response signal received with the second channel frequency as transmitted by any of the other access points.

In a network system according to the invention, at least one access system is then arranged to select a channel frequency for wireless communication with a station, without the use of a network administrator which rearranges the channel frequency in which an access point is arranged to transmit and receive signals.

It is understood that selection of a channel frequency by an access point implies within this context also rearranging itself to be arranged to receive signals with the selected channel frequency.

According to a preferred embodiment of the invention the network system is characterized in that the at least one access point is arranged to transmit each probe signal with a bit rate which is lower than the bit rate used during communication between a station and an access point. The advantage of this embodiment of the network system is that the at least one access point transmits probe signals which are likely to be received by access points located at a relatively large distance from the at least one access point.

According to a further embodiment of the invention the network system is characterized in that the at least one access point is arranged to configure to a signal detection threshold which is lower than the signal detection threshold used during communication between an access point and a station. The at least one access point is thus arranged to enhance the probability of receiving a response signal from access points which are located at a relatively large distance from the at least one access point.

According to another embodiment of the invention, the network system is characterized in that each access paint is arranged as the at least one access point. The advantage is that all access points are arranged to select a channel frequency for use in wireless communication with a station and that for this particular network system no network administrator is needed for rearranging the channel frequencies on which access points are arranged to transmit and receive signals.

According to another embodiment of the invention, the network system is characterized in that the at least one access point is arranged to generate and transmit the probe signals after a predetermined time. The advantage is that at least one access point, in use, is arranged to select another channel frequency for wireless communication with a station if the previously used channel frequency is, due to disturbance on this channel frequency, no longer suitable.

The invention further relates to a card of which an access point is provided with, wherein the access point is part of a network which comprises a plurality of access points, wherein each access point can be used for wireless communication with a station.

These other aspects of the invention will be apparent from an embodiment described hereinafter.

BRIEF DESCRIPTION OF THE DRAWINGS

Below, the invention will be explained with reference to some drawings, which are intended for illustration purposes only and not to limit the scope of protection as defined in the accompanying claims.

FIG. 1 a known network system; and in

DESCRIPTION OF PREFERRED EMBODIMENTS

Figure 1:
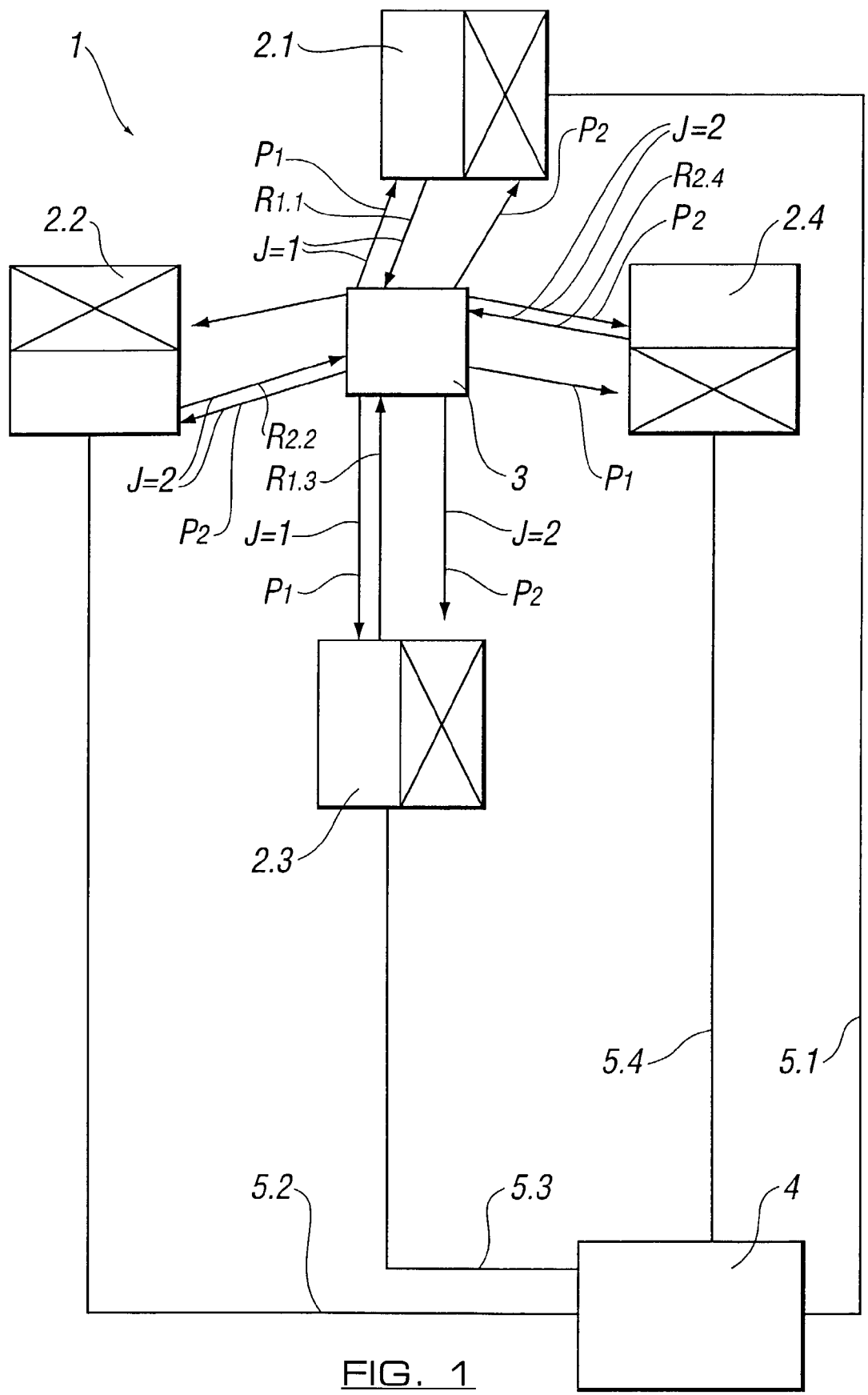

In FIG. 1 a known network system 1 is shown. Network system 1 comprises a plurality of access points 2.$i$ (i=1, 2 . . . , 4). Each access point 2.$i$ can be used for wireless communication with a station 3. In practice, many stations 3 can be present. Each station can wirelessly communicate with an access point 2.$i$ according to, for instance, the IEEE 802.11 standard the contents of which are incorporated herein by reference. Before a station 3 establishes communication with an access point 2.$i$, the station 3, generates and transmits a probe signal P1 with a first channel frequency (j=1).

Access points 2.$i$ which are, at the time on which P1 is transmitted, arranged to receive a probe signal P1 with a first channel frequency (j=1), will receive probe signal P1. In FIG. 1, access point 2.1 and access point 2.3 are, at the time on which station transmits probe signal P1, arranged to receive probe signal P1. Access point 2.2 and access point 2.4 on the other hand, are at the time on which station 3 transmits probe signal P1 with channel frequency (j=1), arranged to receive a probe signal P2 with a channel frequency (j=2). Access point 2.2 and access point 2.4 will thus not receive probe signal P1 with channel frequency (j=1). Access point 2.1 and access point 2.3 are further arranged to generate and transmit in response to the probe signal P1 received with channel frequency (j=1), a response signal R1.1 and a response signal R1.3, respectively. These response signals R1.l, R1.3, are received by station 3. After generating and transmitting probe signal P1 and receiving response signals R1.$i$, station 3 generates and transmits probe signal P2 with channel frequency (j=2). The access points 2.$i$ which are arranged to receive a probe signal P2 with a second channel frequency (j=2) will receive probe signal P2. In FIG. 1, access point 2.2 and access point 2.4 will thus receive probe signal P2 and access points 2.1 and 2.2 will thus not receive probe signal P2. In response to the received probe signal P2, access point 2.2 and access point 2.4 will generate and transmit a response signal R2.2 and a response signal R2.4 respectively, with a channel frequency (j=2). Also response signal R2.2 and response signal R2.4 are received by station 3, which is at that time arranged to receive response signals with a channel frequency (j=2). The station is further arranged to select an access point and a channel frequency to wirelessly communicate with. Each access point 2.$i$ is also arranged to communicate with a network administrator 4. If an access point, for instance, access point 2.2 is arranged to receive a probe signal with a second channel frequency, then network administrator 4 is arranged to rearrange access point 2.2 such that access point 2.2 is then arranged to receive a probe signal with a first channel frequency, and not any longer with a second channel frequency. Network administrator 4 is arranged to select for each access point 2.$i$ a channel frequency j for reception of probe signals.

Figure 2:
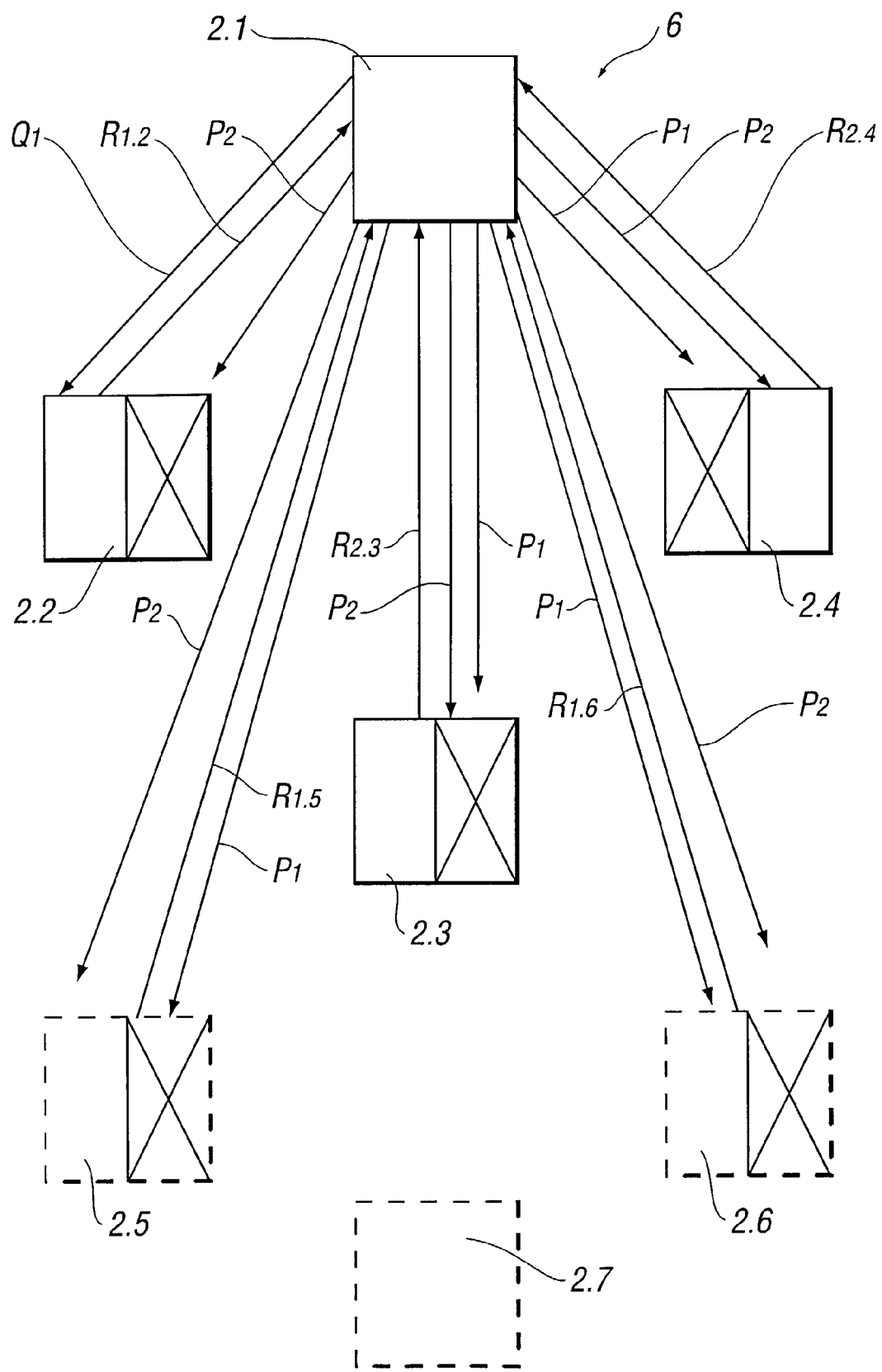
FIG. 2 an embodiment of a network system according to the invention.

In FIG. 2 an embodiment of a network system 6 according to the invention is shown. This network system 6 also comprises a plurality of access points 2.$i$, wherein each access point 2.$i$ can be used for wireless communication with a station (not shown in FIG. 2) At least one access point, in FIG. 2 access point 2.1, is arranged to generate and transmit a first probe signal P1 with channel frequency (j=1). At the time on which probe signal P1 is transmitted, certain access points 2.$i$ are arranged to receive a probe signal with a first channel frequency (j=1). In FIG. 2 access point 2.2 and access point 2.5 and access point 2.6 are arranged to receive probe signal P1 with a channel frequency (j=1). These access points are, at the time on which probe signal P1 is received, also arranged to generate and transmit in response to the received probe signal P1 a response signal Rj.$i$ with channel frequency (j=1). Access point 2.1 is arranged to receive the response signals R1.$i$ with the first channel frequency (j=1) as transmitted by any of the other access points, which has received the probe signal P1 with the first channel frequency (j=1). The at least one access point 2.1 is also arranged to generate and transmit probe signal P2 with the second channel frequency (j=2). At the time on which P2 is transmitted certain access points, in this case access point 2.3 and access point 2.4, are arranged to receive probe signal P2 with a second channel frequency (j=2). These access points 2.3, 2.4 are further arranged to generate and transmit in response to the probe signal P2 received with the second channel frequency (j=2), a response signal R2.$i$ with the second channel frequency (j=2). The at least one access point 2.1 is further arranged to receive the response signals R2.$i$ with the second channel frequency (j=2) as transmitted by any of the access points, in this case access point 2.3 and access point 2.4, which have received the probe signal P2 with the second channel frequency (j=2). Of course there will be a small time, in the order of say 50 microseconds, between the time on which the at least one access point is arranged to generate and transmit the probe signal P1 and the time on which the at least one access point is arranged to generate and transmit probe signal P2. There will equally be a small time between the time on which the at least one access point is arranged to receive the response signals with the first channel frequency (j=1) and the time on which the at least one access point is arranged to receive the response signals with the second channel frequency (j=2). The at least one access point is further arranged to select at least one channel frequency for the wireless communication with the at least one station (not shown) on the basis of at least one response signal R1.$i$ received with the first channel frequency (j=1) and at least one response signal R2.$i$ received with the second channel frequency (j=2).

The number of channel frequencies (j=1, j=2) will in general be a lot higher up to n, with n much higher than 2. The at least one access point, in the case of FIG. 2 access point 2.1, will then be arranged to transmit probe signals P1,P2, . . . Pn with respectively channel frequencies (j=1, 2, ..., n). Accordingly, an access point will then be arranged to receive one of the probe signals P1,P2, ... Pn with channel frequencies (j=1, 2, ..., n). Accordingly, access point 2.i will then be arranged to respond to these probe signals P1,P2, ... Pn. The at least one access point, in this case point 2.1, is then arranged to receive the response signals Rj.i.

The at least one access point, in this case access point 2.i, is, in this example, arranged to select at least one channel frequency (j=1, 2, ... n) for use in wireless communication with a station (not shown in FIG. 2) on the basis of all response signals Rj.i. The at least one access point, in this case access point 2.1, is preferable arranged to transmit each probe signal P1,P2, ... Pn with a bit rate which is lower than the bit rate used during communication between a station (not shown) and an access point 2.i, to enhance the probability that one of the probe signals P1,P2 ..., Pn is also received, by, for example, each of the access points 2.5,2.7,2.6, which are located at a relatively long distance from the at least one access point 2.1. Accordingly, the at least one access point 2.1 is then arranged to configure to a signal detection threshold which is lower than the signal detection threshold used during communication between a station (not shown) and an access point 2.i. This enhances the probability that the at least one access point 2.1 will receive response signals Rj.i. In general, the at least one access point 2.1 is arranged to base the selection on a comparison of a highest reception level for each channel frequency (j=1, 2, ... n). In addition to this, each access point 2.1 can be arranged to base the selection further on a comparison of the load for each channel frequency j, wherein each response signal with channel frequency j contributes to the total load of each channel frequency j. It is further possible that the at least one access point 2.1 is arranged to base the selection on a comparison of an average noise level for each channel frequency j. The channel frequency j, as used within the network system, may not be overlapping. In an embodiment dedicated to such a channel frequency scheme, as for instance used for frequencies around 5 GHz, at least one access point 2.1 is arranged to calculate $CS_{channel\_x}$ and $I_{channel\_x}$, wherein $CS_{channel\_x}$ =Share(RX_L(X))*Load(X)and wherein $$I_{channel\_x} = Noise\_L(j) + \sum_{j=channel\_1}^{channel\_X-1}(RX\_L(j) - RJ(j-X))*Load(j) + \sum_{j=channel\_X+1}^{channel\_N}(RX\_L(j) - RJ(j-X)*Load(j)$$

wherein R_L(j) corresponds to a reception level of a response signal Rj.i with channel frequency j.Load(j) corresponds to the load on channel frequency j, whereas Noise_L(j) corresponds to the noise level of channel frequency j or refers to the result of a noise measurement combining interference and noise of channel j RX_L(j) corresponds to the maximum reception level of response signals Rj.i received with channel frequency j In this case, Share(RX_L(j)) corresponds to a value which depends according to a predetermined relationship on RX_L(j), whereas RJ(j-X) corresponds to a rejection level of a signal with channel frequency j on channel frequency X, wherein RJ(j-X) has a value which depends according to a predetermined relationship on j-X. Typically, RX_L(j) is limited to a −20 to −100 dBm range. With respect to Load(j), an access point 2.i responding with channel frequency j may typically add a load value ranging of 0-100, giving a total limited to a range of 0-1000. As an example, Share(RX_L(j)) equals 0 if RX_L(j) is below 10 dB under the signal detection threshold [dimensionless];

equals 0.1 if RX_L(j) is above 10 dB and under 9 dB below the signal detection threshold; ...

equals i/10 if RX _L(j) is above 10−i+1 dB and under 10−i dB below the signal detection threshold; ...

equals 0.9 if RX_L(j) is above 2 dB and under 1 dB below the signal detection threshold; and equals 1 if RX_L(j) is above 1 dB below the signal detection threshold. RX_L(j) is generally limited to the −50 to −100 dBm range and RJ(j—X) is usually expressed in dB. The rejection numbers are usually derived from rejection figures for reception filters related to spectrum shaping around 5 GHz which characterizes in fact interference on an adjacent channel frequency. Another embodiment may be dedicated to network systems which are arranged to transmit and receive signals, with at least partly overlapping channel frequencies. In such a network system, which typically operates around the 2.4 GHz channel frequencies, the at least one access point is arranged to calculate $CS_{channel\_x}$ and $I_{channel\_x}$, wherein $$CS_{channel\_x} = \sum_{j=channel\_X-1}^{channel\_X+1} Share(RX\_L(j))*Load(j). \text{ Herein } I_{channel\_x} =$$

$$Noise\_L(j) + \sum_{j=channel\_1}^{channel\_X-2}(RX\_L(j) - RJ(j-X))*Load(j) +$$

$$\sum_{j=channel\_X+2}^{channel\_N}(RX\_L(j) - RJ(j-X)*Load(j)$$

In both of the specific embodiments, i.e. the network system operating with partly overlapping channel frequencies and the network system operating with non-overlapping channel frequencies the at least one access point 2.1 is arranged to calculate $CSIQ_{channel\_x}$, wherein $CSIQ_{channel\_x}$=(100%−$CS_{channel\_x}$)−CorFac * $I_{channel\_x}$, wherein a value for CorFac is experimentally determined. The at least one access point is, in this case, arranged to select at least one channel frequency for use in wireless communication with a station on the basis of a value for $CSIQ_{channel\_x}$. Ideally, all access points 2.iare arranged as the at least one access point 2.1. The network system is in that case arranged such that all access points 2.ican automatically select channel frequencies for use in wireless communication with a station. It is understood that selection of a channel frequency by an access point implies within this context also rearranging itself to be arranged to receive signals with the selected channel frequency. The at least one access point 2.iis usually arranged to transmit the probe signals P1,P2, .... Pn after a predetermined time. To avoid simultaneously checking the availability of channel frequencies, each at least one access point can be arranged to transmit the probe signals P1,P2, .... Pn after a for each at least one access point 2.iindividually generated random time. Alternatively, each at least one access point 2.imay be arranged to transmit the probe signals P1,P2, .... Pn after a mutually different time which is centrally determined.

Within the scope of the present invention many alternative embodiments are possible. Access points may be arranged to allow for time between generating and transmitting probe signals with a first channel frequency and generating and transmitting probe signals within a second channel frequency. Additionally, the at least one access point 2.1 may be arranged to transmit probe signals within all possible channel frequencies, every other minute or, e.g., every other hour, depending on the disturbance experienced in communications.

The at least one access point may be arranged to allow the reception of response signals to be delayed, by say 50 milliseconds. This may be necessary if the access point which has to transmit a response signal is temporarily very busy with, for instance, communicating with a station.

The at least one access point may further be arranged to transform a complete lack of reception of a response signal in a very poor reception level of this response signal, or if so desired, in a good reception level and, for instance, additionally high load level of the relevant channel frequency.

Although embodiments of the present invention have been described in detail herein, it is to be understood that this invention is not limited to the precise embodiments and that modifications and variations may be affected therein by one skilled in the art without departing from the scope of the invention as defined by the claims.

What is claimed:

1. A method for selecting a channel frequency for wireless communication between a first access point (AP) and a non-AP station in a communications network operating according to a medium access scheme, the method comprising:
   (a) transmitting, from the first AP, a plurality of probe signals at a plurality of different channel frequencies;
   (b) receiving, at the first AP, a plurality of response signals, each response signal transmitted by a different AP, in response to receipt of one of the probe signals, at a channel frequency corresponding to the channel frequency of the received probe signal;
   (c) determining reception level of each received response signal;
   (d) characterizing reception level of each channel frequency based on the reception level of each corresponding received response signal;
   (e) determining load level of each channel frequency based on the received response signals, wherein the load level is different from the reception level;
   (f) determining noise level of each channel frequency based on the received response signals, wherein the noise level is different from the reception level and the load level;
   (g) generating, for each channel frequency, a cost function value using a closed-form expression that is a function of a reception level parameter, a load level parameter, and a noise level parameter, wherein:
      the reception level parameter is based on the characterized reception level of step (d);
      the load level parameter is based on the determined load level of step (e); and
      the noise level parameter is based on the determined noise level of step (f); and
   (h) selecting the channel frequency for the wireless communication between the first AP and the non-AP station based on the cost function values for the plurality of different channel frequencies.

2. The invention of claim 1, wherein steps (a)-(g) are implemented by the first AP independent of any network administrator.

3. The invention of claim 1, wherein step (d) comprises setting the reception level of each channel frequency based on a maximum reception level of received response signals at the corresponding channel frequency.

4. The invention of claim 1, wherein at least one of:
   (1) each probe signal is transmitted using a bit rate lower than the bit rate used during the wireless communication from the first access point to the non-AP station; and
   (2) each response signal is received using a signal detection threshold lower than the signal detection threshold used during the wireless communication from the non-AP station to the first access point.

5. The invention of claim 1, wherein the channel frequencies are non-overlapping and the method treats adjacent frequency channels and non-adjacent frequency channels using identical cost functions having identical closed-form expressions.

6. The invention of claim 1, wherein the channel frequencies are at least partly overlapping and the method treats overlapping adjacent frequency channels and non-overlapping non-adjacent frequency channels using different cost functions having different closed-form expressions, wherein first and second different channels have at least partly overlapping channel frequencies if a frequency band of the first channel has at least a frequency sub-band in common with a frequency band of the second channel.

7. The invention of claim 1, wherein:
   steps (a)-(g) are implemented by the first AP independent of any network administrator;
   step (d) comprises setting the reception level of each channel frequency based on a maximum reception level of received response signals at the corresponding channel frequency;
   each probe signal is transmitted using a bit rate lower than the bit rate used during the wireless communication from the first access point to the non-AP station;
   each response signal is received using a signal detection threshold lower than the signal detection threshold used during the wireless communication from the non-AP station to the first access point;
   if the channel frequencies are non-overlapping, then the method treats adjacent frequency channels and non-adjacent frequency channels using identical cost functions; and
   if the channel frequencies are at least partly overlapping, then the method treats overlapping adjacent frequency channels and non-overlapping non-adjacent frequency channels using different cost functions.

8. A first access point (AP) for a communications network operating according to a medium access scheme, the first AP adapted to:
   (a) transmit a plurality of probe signals at a plurality of different channel frequencies;
   (b) receive a plurality of response signals, each response signal transmitted by a different AP, in response to receipt of one of the probe signals, at a channel frequency corresponding to the channel frequency of the received probe signal;
   (c) determine reception level of each received response signal;
   (d) characterize reception level of each channel frequency based on the reception level of each corresponding received response signal;
   (e) determine load level of each channel frequency based on the received response signals, wherein the load level is different from the reception level;

(f) determine noise level of each channel frequency based on the received response signals, wherein the noise level is different from the reception level and the load level; and (g) generate, for each channel frequency, a cost function value using a closed-form expression that is a function of a reception level parameter, a load level parameter, and a noise level parameter, wherein:

the reception level parameter is based on the characterized reception level of step (d);

the load level parameter is based on the determined load level of step (e); and the noise level parameter is based on the determined noise level of step (f); and (h) select a channel frequency for wireless communication between the first AP and a non-AP station based on the cost function values for the plurality of different channel frequencies.

9. The invention of claim 8, wherein the first AP is adapted to set the reception level of each channel frequency based on the maximum reception level of received response signals at the corresponding channel frequency.

10. The invention of claim 8, wherein the first AP is adapted to:

(1) transmit each probe signal using a bit rate lower than the bit rate used during the wireless communication from the first access point to the non-AP station; and (2) receive each response signal using a signal detection threshold lower than the signal detection threshold used during the wireless communication from the non-AP station to the first access point.

11. The invention of claim 8, wherein the channel frequencies are non-overlapping and the first AP is adapted to treat adjacent frequency channels and non-adjacent frequency channels using identical cost functions having identical closed-form expressions.

12. The invention of claim 8, wherein the channel frequencies are at least partly overlapping and the first AP is adapted to treat overlapping adjacent frequency channels and non-overlapping non-adjacent frequency channels using different cost functions having different closed-form expressions, wherein first and second different channels have at least partly overlapping channel frequencies if a frequency band of the first channel has at least a frequency sub-band in common with a frequency band of the second channel.

13. The invention of claim 8, wherein:

the first AP is adapted to set the reception level of each channel frequency based on the maximum reception level of received response signals at the corresponding channel frequency;

the first AP is adapted to transmit each probe signal using a bit rate lower than the bit rate used during the wireless communication from the first access point to the non-AP station;

the first AP is adapted to receive each response signal using a signal detection threshold lower than the signal detection threshold used during the wireless communication from the non-AP station to the first access point;

if the channel frequencies are non-overlapping, then the first AP treats adjacent frequency channels and non-adjacent frequency channels using identical cost functions; and if the channel frequencies are at least partly overlapping, then the first AP treats overlapping adjacent frequency channels and non-overlapping non-adjacent frequency channels using different cost functions.

* * * * *